Figure 1:
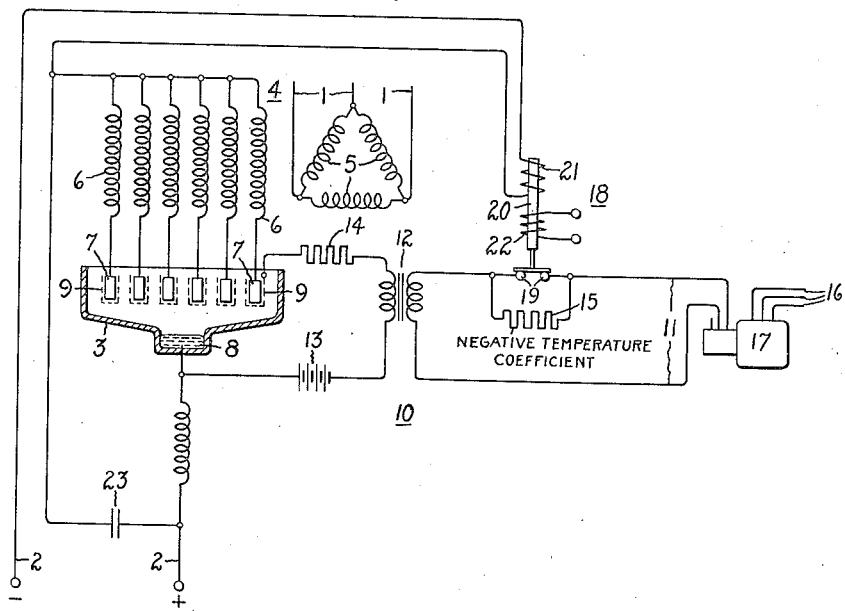

July 30, 1940.                F. HAUFFE                    2,209,818
                CONTROL SYSTEM FOR ELECTRIC VALVE APPARATUS
                            Filed May 9, 1939

Inventor:
Friedrich Hauffe,
by Harry E. Dunham
His Attorney.

Patented July 30, 1940

2,209,818

UNITED STATES PATENT OFFICE 2,209,818

CONTROL SYSTEM FOR ELECTRIC VALVE APPARATUS

Friedrich Hauffe, Berlin-Friedenau, Germany, assignor to General Electric Company, a corporation of New York Application May 9, 1939, Serial No. 272,733
In Germany May 27, 1938

5 Claims. (Cl. 175—363)

My invention relates to electric valve apparatus and more particularly to control or protective systems for controlling the operation of electric valve means under irregular or abnormal operating conditions.

In the protection of electric valve translating apparatus against overload conditions or against arc-back conditions, it is frequently desirable to impress on the control electrodes of the electric valve means voltages of the proper magnitude in order to reduce the current transmitted for a period of time in order to provide an opportunity for the fault to be cleared from the system, or in order to provide a sufficient interval of time for the arc-back condition to be corrected. Heretofore various devices and control circuits have been employed to clear faults and to render the electric valve means temporarily nonconductive under fault conditions. Many of the prior art arrangements have necessarily involved the use of apparatus of a complex nature, requiring a large number of parts, and which is correspondingly expensive. In accordance with the teachings of my invention described hereinafter, I provide a new and improved protective system for electric valve translating apparatus which is susceptible of varied application and which requres only a minimum number of control or auxiliary parts.

It is an object of my invention to provide a new and improved electric valve circuit.

It is another object of my invention to provide a new and improved protective system for electric valve translating apparatus.

It is a further object of my invention to provide new and improved protective apparatus in the control or excitation circuit for electric valve apparatus.

In accordance with the illustrated embodiment of my invention, I provide a new and improved protective system for electric valve means of the controlled type having a control member, or control members, for controlling the conductivity thereof. An excitation circuit or a plurality of excitation circuits impress on the control members of the electric valve means periodic voltages to render the electric valve means conductive and thereby to control the amount of power transmitted between associated alternating current and direct current circuits. More specifically, I provide a protective system associated with the excitation circuit of electric valve means which comprises a source of periodic voltage which is impressed, under normal operating conditions, on the associated control members. I provide an impedance element having a negative temperature coefficient for effecting a temporary reduction of voltage applied to the control members of the electric valve means upon the occurrence of an abnormal or irregular operating condition, such as overload or arc-back. The impedance element is normally rendered ineffective by a contactor in the contactor mechanism, so that the periodic voltage is impressed on the control members in the desired manner. A control circuit responsive to a predetermined controlling influence, such as overload, over-current, or arc-back, actuates the contactor mechanism to connect effectively the impedance element in series relation with the source of periodic voltage, thereby temporarily reducing the magnitude of the periodic voltage which is impressed on the control member to decrease the conductivity of the electric valve means for a predetermined interval of time, or to render completely nonconductive the electric valve means for a predetermined interval of time. The interval of time is determined by the resistance-temperature characteristic of the impedance element.

Figure 2:
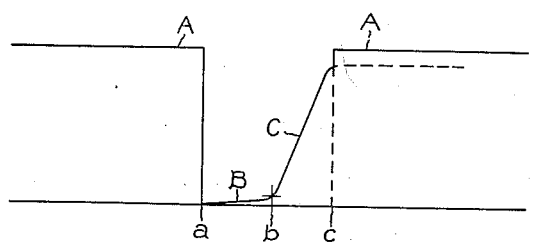

For a better understanding of my invention, reference may be had to the following description taken in connection with the accompanying drawing, and its scope will be pointed out in the appended claims. Fig. 1 of the accompanying drawing diagrammatically illustrates my invention as applied to a multi-anode electric valve means for transmitting power between an alternating current circuit and a direct current circuit, and Fig. 2 represents certain operating characteristics of the system shown in Fig. 1.

Referring now to the embodiment of my invention diagrammatically illustrated in Fig. 1, an alternating current circuit 1 and a direct current circuit 2 are interconnected through electric translating apparatus comprising an electric valve means 3 and a transformer 4 having a plurality of primary windings 5 and a plurality of secondary windings 6. The electric valve means 3, for the purposes of illustration, is shown as being of the type comprising a plurality of anodes 7 enclosed within a single envelope and having a cathode 8. The electric valve means 3 is preferably of the type employing an ionizable medium such as a gas or a vapor, and in the particular arrangement illustrated the electric valve means 3 is shown as being of the type employing mercury vapor as the ionizable medium, the cathode 8 being of the self-reconstructing type and consisting of a pool of mercury. A plurality of control members 9 are each associated with a different one of the anodes 7 and serve to control the conductivities of the respective arc discharge paths between the various anodes 7 and the associated cathode 8.

I provide a protective system for electric valve translating apparatus whereby the electric valve means is temporarily rendered ineffective to transmit current for a predetermined interval of time, or whereby the amount of current or the conductivity of the electric valve means is decreased for a predetermined interval of time in order to permit correction or removal of the abnormal or irregular operating conditions imposed on the electric valve means. More specifically, I provide an impedance element having a negative temperature coefficient which operates on control means associated with the electric valve means to render the electric valve means completely nonconductive for an interval of time, or to reduce the conductivities of the electric valve means for a period of time. In the particular embodiment of my invention illustrated, I have chosen to show my protective arrangement associated with the excitation circuit or control circuits of the electric valve means. For example, I provide a plurality of control or excitation circuits for energizing the control members 9 of the electric valve means 3 and which impress on the control members 9 periodic voltages of predetermined phase displacement and phase rotation in order that the various anodes may conduct current in a predetermined order. To facilitate illustration and description of my invention only one excitation circuit, that is excitation circuit 10, is illustrated. The excitation circuit 10 comprises a source 11 of periodic voltage, such as an alternating voltage, a transformer 12, a source of negative unidirectional biasing potential, such as a battery 13, and a current limiting resistance 14. In the excitation circuit 10 I provide a suitable impedance element, such as a resistance 15, having a negative temperature coefficient, that is, a resistance having a negative resistance-temperature characteristic. The source of periodic voltage 11 may be derived from any suitable circuit of adjustable phase and of the desired frequency. In the drawing, the circuit 11 is shown as being energized from a circuit 16 through a suitable phase shifting device, such as a rotary phase shifter 17, which may comprise primary and secondary windings of the distributed type. Of course, it is to be understood that the rotary phase shifter 17 may be energized from the alternating current circuit 1, if desired.

Under normal operating conditions, the resistance 15 is rendered ineffective by a suitable means which is responsive to abnormal or irregular operating conditions, or which is responsive to any predetermined controlling influence. More specifically, I provide a contactor mechanism 18 comprising contacts 19, an armature 20 and actuating coils 21 and 22. The contactor mechanism 18 may be arranged to be responsive to any predetermined controlling influence, such as arc-back overload, or over-current conditions of the electric valve means 3. Actuating coil 21 of the contactor mechanism 18 is arranged to raise the armature 20 and to open the contacts 19, and is energized from the direct current circuit 2 through a suitable control circuit which may comprise a capacitance 23. The capacitance 23 serves to transmit a transient current in response to the rate of change of the voltage or current of the direct current circuit 1 to effect temporary energization of the actuating coil 21.

The operation of the embodiment of my invention shown in Fig. 1 will be explained by considering the system when it is operating to transmit power from the alternating current circuit 1 to the direct current circuit 2. Under normal operating conditions, the anodes 7 of the electric valve means 3 conduct current in a predetermined order, and the average current conducted by each of the associated discharge paths and hence the average current conducted by the electric valve means 3 is determined by the phase of the periodic voltages impressed on the control members 9 by the excitation circuits with respect to the voltages of the associated anodes. As is well understood by those skilled in the art, the average current transmitted by the electric valve means is increased as the phase of the control voltages is advanced from a lagging position toward the point of phase coincidence, and the conductivity is decreased as the control voltages are retarded in phase. The periodic or alternating voltages provided by the source 11 in each of the excitation circuits is impressed on the primary winding of the transformer 12, and a voltage of the proper magnitude is impressed on the associated control member 9. The magnitude of the voltage induced in the secondary winding of the transformer 12 is sufficient to overcome the effect of the negative biasing potential supplied by battery 13. The output voltage and current of the electric valve means 3, of course, may be controlled or varied by means of the rotary phase shifter 17.

Upon the occurrence of an irregular or abnormal operating condition, such as a short circuit of the direct current circuit 2 or an arc-back condition, the actuating coil 21 of the contactor mechanism 18 is temporarily energized to open the contacts 19, thereby effectively connecting in the excitation circuit 10 the resistance 15 in series relation with the source 11 and the primary winding of transformer 12. The magnitude of resistance 15 is chosen so that the voltage impressed on primary winding of transformer 12 is of sufficient magnitude to reduce the voltage applied thereto substantially so that the net voltage impressed on the associated control member 9 is materially reduced. The reduction in voltage impressed on the control member is such that the electric valve means 3 may be rendered completely nonconductive for a predetermined interval of time, or the conductivity of the electric valve means 3 may be materially reduced for an interval of time to permit the removal of a fault condition. Due to the fact that the impedance element or resistance 15 is characterized by having a negative temperature coefficient, the impedance or resistance thereof decreases with time, and after a predetermined interval of time the voltage applied to the control member 9 increases. The rate at which the voltage applied to the control member 9 increases is determined by the slope or gradient of the resistance-temperature characteristic of the resistance 15. Accordingly, after the lapse of a definite interval of time the voltage impressed on the control member 9 is raised at a definite rate to gradually restore the operation of the system to that condition which existed prior to the occurrence of the fault.

The operation of my invention may be better explained by referring to the operating characteristics shown in Fig. 2. Curve A represents the value of the voltage applied to the control members 9. The time $a$ represents that time at which the abnormal operating condition occurred and the time at which the contacts 19 of the contactor mechanism 18 are opened, thereby effectively connecting the resistance 15 in the excitation circuit 10. During the interval a—b, the voltage impressed on the control member 9 is, of course, substantially reduced, as illustrated by curve B, but increases slightly at a predetermined rate dependent upon the resistance-temperature characteristic of the impedance element 15. During the interval b—c, the voltage applied to the control member is increased at a greater rate as illustrated by curve C. This rate of rise of the voltage is also determined by the gradient of the characteristic of resistance 15. At time c, if the abnormal or short-circuit condition has been removed from the direct current circuit 2, the actuating coil 21 is deenergized due to the fact that the transient effect of the energization of the coil 21 has disappeared, and the contacts 19 are again closed increasing the voltage impressed on the control member 9 to a value represented by curve A. It is to be understood that by the proper choice of the resistance-temperature characteristic, the electric valve means 3 may be rendered completely non-conductive for a definite interval of time, or that the electric valve means may be rendered partially non-conductive for a predetermined interval of time. Furthermore, it is to be understood that the combination of these conditions may be obtained; that is, the electric valve means may be rendered substantially non-conductive for one interval of time and the output of electric valve means 3 may be reduced during a second interval of time. In addition, during that second interval of time, the conductivity of the electric valve means may be gradually increased, as, for example, during the interval b—c.

Where it is desired to effect closure of the contacts 19 at a precisely determinable time after the occurrence of the abnormal operating condition, a timing circuit may be connected to the actuating coil 22 of the contactor mechanism 18 to overcome the effect of the coil 21 and to drop the armature 20 to the lower position. For example, a timing circuit could be connected to the actuating coil 22 and initiated in its operation in response to the occurrence of an abnormal condition to energize coil 22 after the lapse of a definite interval of time. For example, the timing circuit could be initiated in its operation at time a of Fig. 2 and could be arranged to close contacts 19 at time c.

While my invention has been particularly described as concerned with a protective device connected in the grid or excitation circuit of electric valve means, it is to be understood that in its broader aspects my invention is generally applicable to the protection of electric valve translating apparatus.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric valve means, control means for said electric valve means, an impedance element having a negative temperature coefficient, means for normally rendering ineffective said impedance element, and means responsive to a predetermined controlling influence for effectively connecting said impedance element in circuit with said control means to render said control means ineffective for a predetermined interval of time dependent upon the gradient of the resistance-temperature characteristic of said impedance element.

2. In combination, an electric valve means having an anode, a cathode and a control member, and an excitation circuit for energizing said control member comprising means for impressing thereon a periodic voltage, an impedance element having a negative temperature coefficient, means for shunting said impedance element during normal operation of said electric valve means, and means for connecting said impedance element effectively in circuit upon the occurrence of a predetermined controlling influence to reduce temporarily the voltage impressed on said control member during the existence of said influence.

3. In combination, an alternating current circuit, a direct current circuit, electric valve means connected between said circuits and comprising a control member for controlling the conductivity thereof, an excitation circuit for impressing on said control member a periodic voltage and an impedance element having a negative temperature coefficient, means for rendering ineffective said impedance element during normal operation, and means responsive to a predetermined controlling influence derived from either of said first mentioned circuits for connecting said impedance element effectively in said excitation circuit to render temporarily ineffective said periodic voltage.

4. In combination, an alternating current circuit, a direct current circuit, electric translating apparatus connected between said circuits and comprising an electric valve means having a control member, an excitation circuit for impressing on said control member a periodic voltage and including an impedance element having a negative temperature coefficient, a normally closed contact for shunting said impedance element during normal operation, and means responsive to a predetermined controlling influence for actuating said contactor to connect said impedance element effectively in said excitation circuit, said impedance element serving to render ineffective said periodic voltage.

5. In combination, an electric valve means of the type employing an ionizable medium and having an anode, a cathode and a control member, means for impressing on said control member a negative unidirectional biasing potential, means for impressing on said control member a periodic voltage sufficient in magnitude to overcome the effect of said biasing potential to render said electric valve means conductive periodically, an impedance element having a negative temperature coefficient, and means responsive to a predetermined controlling influence for effectively connecting said impedance element in series relation with said periodic voltage to render ineffective temporarily said periodic voltage.

FRIEDRICH HAUFFE.